United States Patent
Higashiyama

(10) Patent No.: US 7,438,150 B2
(45) Date of Patent: Oct. 21, 2008

(54) SEAT BELT APPARATUS

(75) Inventor: Yoji Higashiyama, Chiryu (JP)

(73) Assignee: Denso Corporation, Kariya (JP)

( * ) Notice: Subject to any disclaimer, the term of this patent is extended or adjusted under 35 U.S.C. 154(b) by 292 days.

(21) Appl. No.: 11/063,878

(22) Filed: Feb. 24, 2005

(65) Prior Publication Data

US 2005/0205330 A1    Sep. 22, 2005

(30) Foreign Application Priority Data

Mar. 22, 2004    (JP)    ............................ 2004-083207

(51) Int. Cl.
B60R 22/46    (2006.01)
(52) U.S. Cl. .................. 180/268; 280/806; 180/274
(58) Field of Classification Search ................. 180/268, 180/274, 281, 282; 280/801.2, 806, 807, 280/808
See application file for complete search history.

(56) References Cited

U.S. PATENT DOCUMENTS

| | | | | |
|---|---|---|---|---|
| 4,529,143 A | * | 7/1985 | Kanada et al. ............ | 242/375.3 |
| 4,588,144 A | * | 5/1986 | Nishimura ................ | 242/375.3 |
| 4,790,405 A | * | 12/1988 | Kataoka ..................... | 180/268 |
| 5,552,986 A | | 9/1996 | Omura et al. | |
| 6,332,629 B1 | * | 12/2001 | Midorikawa et al. ........ | 280/806 |
| 2001/0004997 A1 | * | 6/2001 | Yano et al. ................ | 242/390.8 |
| 2006/0290131 A1 | * | 12/2006 | Tanaka ....................... | 280/807 |

FOREIGN PATENT DOCUMENTS

| | | | |
|---|---|---|---|
| JP | B2-2868952 | | 12/1998 |
| JP | 2001-247006 | * | 9/2001 |
| JP | 2001-270363 | | 10/2001 |

* cited by examiner

*Primary Examiner*—Ruth Ilan
(74) *Attorney, Agent, or Firm*—Posz Law Group, PLC

(57) ABSTRACT

A seat belt apparatus has a seat belt, a retracting device for the seat belt, a clash predicting means for outputting a clash predicting signal, a control unit for operating the retracting device when it receives the clash predicting signal, and a switching means for prohibiting the operation of the retracting device when the switching means is manually operated to an OFF state. As a result, unpleasant feeling to a vehicle occupant can be reduced.

3 Claims, 2 Drawing Sheets

SEAT BELT APPARATUS

CROSS REFERENCE TO RELATED APPLICATION

This application is based on Japanese Patent Application No. 2004-083207 filed on Mar. 22, 2004, the disclosure of which is incorporated herein by reference.

FIELD OF THE INVENTION

The present invention relates to a seat belt apparatus, in particular to a seat belt apparatus in which a seat belt is retracted to be more tightly fastened for protecting a vehicle occupant when a possible crash is predicted.

BACKGROUND OF THE INVENTION

Various kinds of seat belt apparatus having a pre-tensioning function are already known, in which a seat belt is retracted to strongly restrain a vehicle occupant sitting in a vehicle seat, when a possible crash is predicted. The seat belt is generally fastened in an unstrained condition, because the seat belt may give an unpleasant feeling to the vehicle occupant when it is tightly fastened. The seat belt, however, as the case may be, can not assure safety for the vehicle occupant depending on largeness of the crash, when the vehicle crashes in a condition that the seat belt is fastened in the unstrained condition.

According to a seat belt apparatus, for example, as disclosed in Japanese patent No. 2 946 995 or No. 2 868 952, the safety for the vehicle occupant is more reliably assured at a vehicle crash, by retracting the seat belt in advance to eliminate its loose when a possible vehicle crash is predicted.

A seat belt detecting device, such as a buckle switch, is generally provided in the seat belt apparatus for detecting whether the seat belt is fastened or not, so that the seat belt apparatus can determine based on a detected signal from the seat belt detecting device that the seat belt is fastened. And the seat belt is retracted when the vehicle crash is predicted. As a device or means for predicting the possible vehicle crash, a vehicle control device such as an acceleration sensor, a detecting device for a vehicle stopping lamp, a detecting device of a vehicle brake, or a vehicle distance detecting device such as a millimeter-wave radar device, a laser radar device or the like, can be used.

When the acceleration sensor (G sensor) is used as the crash predicting means, the possible vehicle crash is predicted based on a detection of a strong brake operation. In the case that the detecting device for the vehicle stopping lamp is used as the crash predicting means, the vehicle crash is predicted based on the detection of the operation of the lamp. In the case that the detecting device of the vehicle brake is used as the crash predicting means, the vehicle crash is predicted based on a pressure change of braking fluid at a master cylinder of a braking device. Furthermore, when the millimeter-wave radar device or the laser radar device is used as the crash predicting means, the vehicle crash is predicted based on the detected distance between the self vehicle and an obstacle or another vehicle running on an opposite lane.

The above crash predicting means may erroneously output a crash predicting signal, even when there is no danger for an actual vehicle crash, because the possible vehicle crash is predicted based on a change of vehicle running condition in any of the above crash predicting means. The seat belt may be retracted even in the case that there is no danger of the crash, and such operation may give an unpleasant feeling to the vehicle occupant.

Further, in the case that the child is sitting in the seat, the unpleasant feeling to the child would become larger, when the seat belt is retracted.

SUMMARY OF THE INVENTION

It is, therefore, an object of the present invention, in view of the above mentioned problems, to provide a seat belt apparatus, in which unpleasant feeling to a vehicle occupant is reduced.

According to a feature of the present invention, a seat belt apparatus has a seat belt, a retracting device for the seat belt, a crash predicting means for outputting a crash predicting signal, a control unit for operating the retracting device when it receives the crash predicting signal, and a switching means for prohibiting the operation of the retracting device when the switching means is manually operated to an OFF state.

According to the above feature, the retracting operation for the seat belt is prohibited, when an error signal of the vehicle crash is anticipated, for example a vehicle is running on a punishing road. Accordingly, unpleasant feeling caused by the retraction of the seat belt can be avoided.

According to another feature of the present invention, a seat belt apparatus has a seat belt, a retracting device for the seat belt, a crash predicting means for outputting a crash predicting signal, a control unit for operating the retracting device when it receives the crash predicting signal, and a child seat detecting means for detecting whether a child seat is mounted on a passenger's seat. In the seat belt apparatus, the retracting device retracts the seat belt at a lower retracting force, when it is detected that the child seat is mounted on the seat, than a retracting force when an adult is sitting in the seat.

According to the above feature of the invention, the unpleasant feeling to the child can be reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
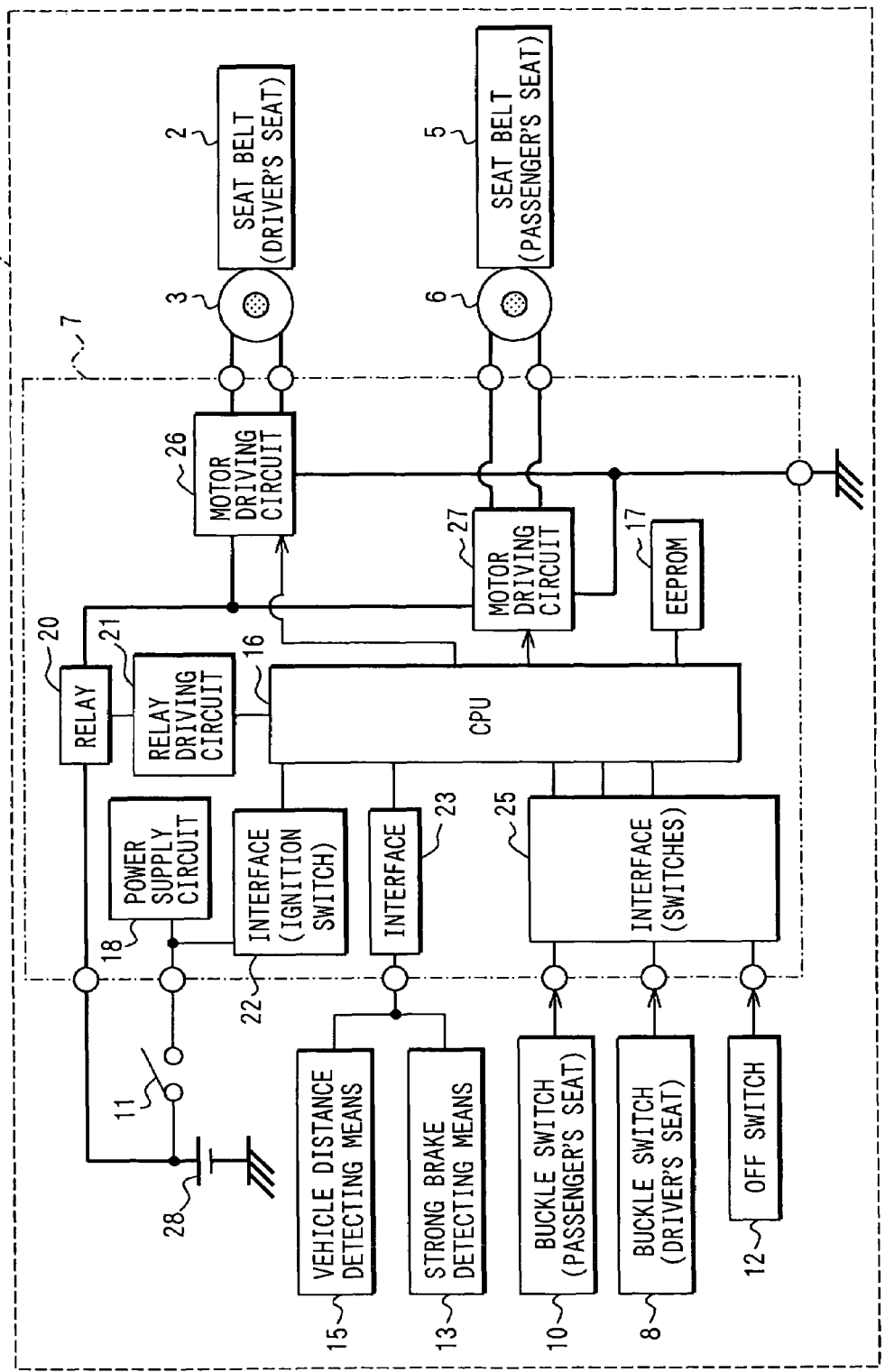
FIG. 1 is a schematic view showing a seat belt apparatus according to a first embodiment of the present invention.

A first embodiment of the present invention will now be explained with reference to the drawing.

In a seat belt apparatus 1 according to the first embodiment shown in FIG. 1, an electric motor 3, which is a retracting means (retracting device) for retracting a seat belt, is provided to a reel shaft (not shown) of a seat belt device 2 for a vehicle driver. An electric motor 6, which is a retracting means (retracting device) for retracting a seat belt, is likewise provided to a reel shaft (not shown) of a seat belt device 5 for a vehicle passenger. The electric motors 3 and 6 are connected to a seat belt control unit 7.

The seat belt apparatus 1 comprises a crash predicting means (13 and 15), a buckle switch 8 for a driver's seat, a buckle switch 10 for a passenger's seat, an ignition switch 11, and an OFF switch 12. The crash predicting means comprises a strong brake detecting means 13 having a G sensor (not shown) provided at a front side of a vehicle, and a vehicle distance detecting means 15, wherein those detecting means 13 and 15 are connected to the seat belt control unit 7 and independently output a crash predicting signal.

The buckles switches 8 and 10 respectively output ON signals, when the respective seat belts for the driver's seat and the passenger's seat are fastened. The ignition switch 11 outputs ON signal when an ignition key is inserted and turned on. The OFF switch 12 outputs a stop signal for prohibiting an operation of the motors 3 and 6, when the OFF switch 12 is manually operated (turned on) by a passenger (or a driver). The above buckle switches 8 and 10, the ignition switch 11 and the OFF switch 12 are connected to the seat belt control unit 7.

The seat belt control unit 7 comprises CPU 16, EEPROM 17, a power supply circuit 18, a relay 20, a relay driving circuit 21, an interface 22 for the ignition switch (11), an interface 23 for signal communication, an interface 25 for the switches (8, 10, 12), a motor driver circuit 26 for the motor 3 on the driver's side, and a motor driver circuit 27 for the motor 6 on the passenger's side.

The CPU operates with electric power from the power supply circuit 18, which is connected to a battery 28. The power supply circuit 18 is connected to the battery 28 via the ignition switch 11. The power supply circuit 18 and the CPU 16 are connected to each other via the interface 22. The relay 20 is connected to the battery 28, separately from the power supply circuit 18, for switching on and off the electric power supply to the motors 3 and 6. The relay driving circuit 21 for driving the relay 20 is connected to the CPU 16, so that the relay driving circuit 21 is controlled by the CPU 16.

The CPU 16 includes RAM and ROM for reading out and performing a weight calculating program, a seat belt fastening detecting program and so on, which are memorized in ROM. A working area for the CPU 16 is secured in RAM.

The interface 22 is connected to a signal communication line, which connects the ignition switch 11 with the power supply circuit 18. The interface 22 transmits an ON or OFF signal from the ignition switch 11 to the CPU 16 via a signal communication line. The interface 23 is connected to the strong brake detecting means 13 and the vehicle distance detecting means 15 via respective signal communication lines, and transmits the predicting signal from the strong brake detecting means 13 and the vehicle distance detecting means 15 to the CPU 16 via a signal communication line.

The interface 25 is connected to the buckle switches 8 and 10 and the OFF switch 12. The interface 25 transmits an ON or OFF signal from the buckle switches 8 and 10 or the OFF switch 12 to the CPU 16 via signal communication lines.

According to the seat belt apparats 1 of the embodiment, the seat belt 2 and/or 5 are retracted, when the crash predicting signal is transmitted to the CPU 16 from at least one of the strong brake detecting means 13 and the vehicle distance detecting means 15, under the condition that the ignition switch 11 is turned on and the buckle switch 8 (and/or 10) is turned on.

An operation of the seat belt apparatus 1 is explained.

When the ignition switch 11 is turned on, the ON signal is transmitted from the ignition switch 11 to the CPU 16. The CPU 16 operates the relay driving circuit 21 upon receiving the ON signal from the ignition switch 11, so that the motor driving circuit 26 for the driver's seat and the motor driving circuit 27 for the passenger's seat are connected to the battery 28 via the relay 20. When the buckle switches 8 and 19 are turned on, the ON signals are transmitted to the CPU 16, so that the seat belt apparatus 1 becomes a standby condition, in which the seat belts 2 and 5 will be retracted in the case that the CPU receives the crash predicting signal.

When the vehicle is controlled by a strong brake operation, or the vehicle distance becomes shorter, the crash predicting signal is outputted from the strong brake detecting means 13 or the vehicle distance detecting means 15. Then, the CPU 16 outputs an operation signal to the motor driving circuits 26 and 27, to drive the electric motors 3 and 6 so that the seat belts 2 and 5 are retracted. As above, the loose of the seat belts can be eliminated before the possible vehicle crash to secure the safety of the occupants (the driver and the passenger).

The crash predicting signal are also outputted from the crash predicting means (the strong brake detection means 13 and/or the vehicle desistance detecting means 15), when the vehicle is running on a punishing road and thereby the vehicle is repeatedly controlled with the strong brake operation or when the vehicle is running on a crowded road and thereby the vehicle distance becomes very short. The crash predicting signals in those cases are error signals, because the vehicle crash would not occur. When the seat belts are retracted to firmly restrain the occupant in those cases, an unpleasant feeling may be given to the occupant.

In such a case, the OFF switch 12 can be manually operated by the occupant to prohibit the operation of the motors 3 and 6. Namely, the OFF signal is outputted from the OFF switch 12 to the CPU 16. The CPU 16 outputs an operation signal to the motor driving circuits 26 and 27, so that the motors 3 and 6 are not operated even if the CPU 16 receives the crash predicting signals.

The OFF switch can output an ON signal, when it is manually turned on by the occupant. When the ON signal is transmitted to the CPU 16, the motor driving circuits 26 and 27 are changed to the standby condition. As above, the seat belt apparatus 1 can be manually controlled to return to its standby condition.

According to the above embodiment, the seat belts are prevented from being retracted based upon the error signal, to thereby reduce the unpleasant feeling to the occupant, while the safety can be assured by retracting the seat belts when it is necessary.

Second Embodiment

Figure 2:
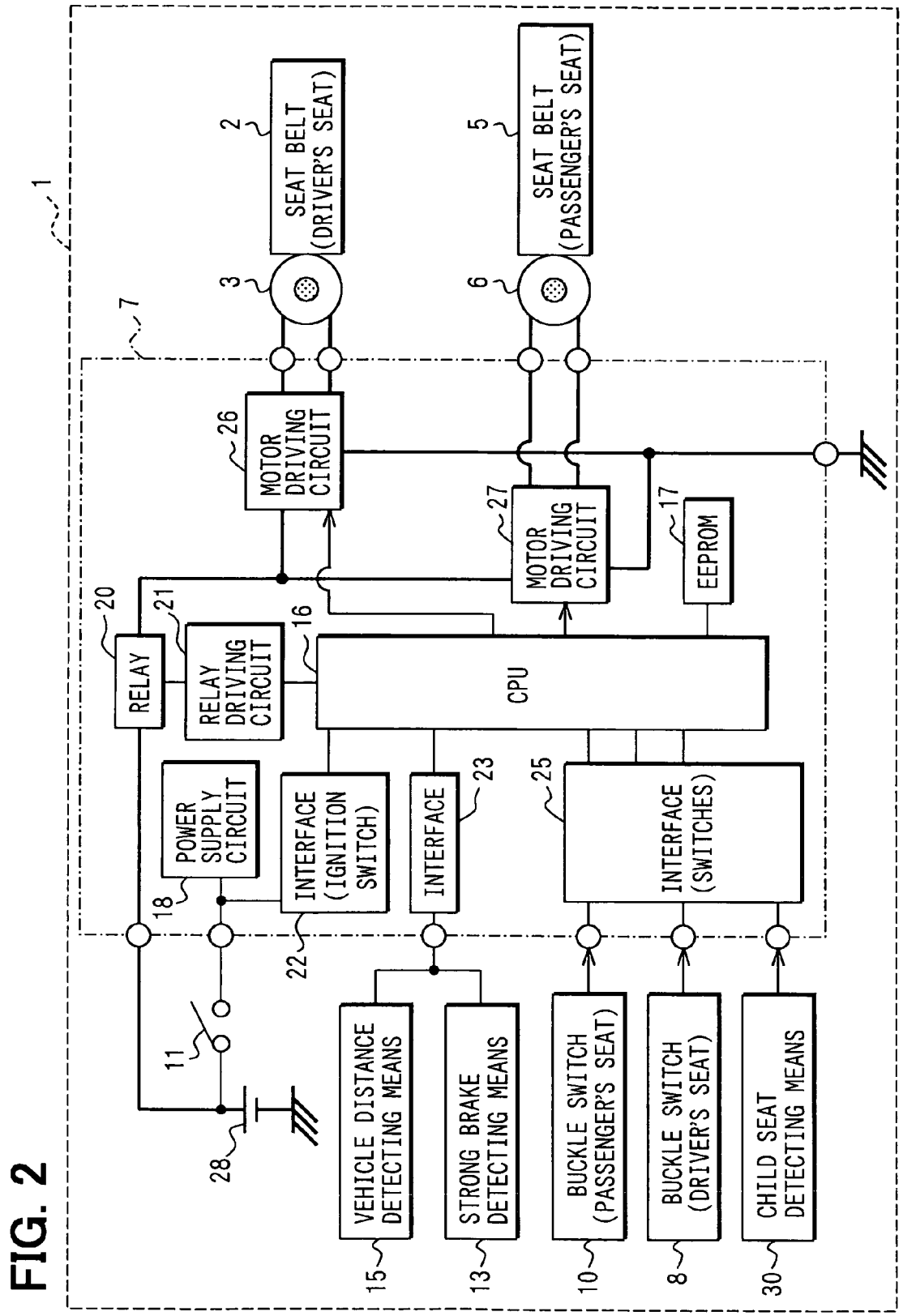
FIG. 2 is a schematic view showing a seat belt apparatus according to a second embodiment of the present invention.

A second embodiment of the present invention is explained with reference to FIG. 2, which differs from the first embodiment in that a child seat detecting means 30 is provided instead of the OFF switch 12 and the electric motor 6 for the passenger's seat is operated at two different (high and low) rotational speeds, wherein the electric motor 6 is operated at the low rotational speed when a detecting signal for the child seat is outputted from the child seat detecting means 30.

According to the second embodiment, the child seat detecting means 30 is provided at the passenger's seat, to output an ON signal when a child seat (not shown) is mounted on the passenger's seat and an OFF signal when the child seat is detached from the passenger's seat. The child seat detecting means 30 is connected to the CPU 16 via the interface 25, like the buckle switches 8 and 10.

The seat belt apparatus 1 according to the embodiment is made to the standby condition, when the CPU 16 receives the ON signal from the ignition switch 11 and the ON signal from the buckle switch 8. When the CPU 16 further receives the ON signal from the child seat detecting means 30, a control signal is outputted from the CPU 16 to the motor driving circuit 27 for the passenger's seat to switch over to an operational mode of the low rotational speed. The electric motor 6 is thereby made to its standby condition for retracting the seat belt at a lower retracting force than that for the driver's seat.

When the crash predicting signal is inputted into the CPU 16 under the standby condition, the seat belt 2 for the driver's seat is retracted at the normal retracting force, while the seat belt for the passenger's seat is retracted at the lower retracting force. Accordingly, unpleasant feeling to the child sitting in the child seat can be reduced.

Other Embodiments

In the above embodiments, well known devices, such as the strong brake detecting means, the vehicle distance detection means, are used as the crash predicting means. Any other known devices can be used as the crash predicting means by itself or in combination of the multiple known devices. The crash predicting means can be connected by air.

A mechanical switching means can be provided between the battery and the retracting device and the switching means can be turned on and off by the control unit. The control unit can be assembled integrally into another control unit, for example an air-bag ECU.

The retracting device comprising the electric motor can be such a device in which the motor is rotated only in the retracting direction, or can be rotated in the retracting direction and in the opposite direction (releasing direction).

The OFF switch is provided in the passenger's room of the vehicle. The OFF switch can be a mechanical type or electrical type switch provided between the battery and the retracting device for cutting off the electric power supply to the retracting device.

The OFF switch can be directly provided to the retracting device, or connected to the retracting device via a control means. When the OFF switch is provided to the retracting device via the control means, the seat belt apparatus can be made simpler in its structure.

In the first embodiment, the crash predicting means comprises multiple (two) detecting means. And the retraction of the seat belt is prohibited when the crash predicting signal is outputted from at least one of the multiple detecting means.

It is preferable, however, that the seat belt is retracted when the crash predicting signals are outputted from both of the detecting means, even when the OFF switch is turned on. In such an arrangement, the seat belt retraction can be avoided based on the error signal, and in addition more safety can be assured if the actual crash has occurred after the retraction of the seat belt is prohibited, because the seat belt is retracted in case of the actual crash. In such arrangement, the different types of the detecting means, such as the vehicle distance detecting means and the strong brake detecting means, as in the present invention, are more preferable in order to prevent the seat belt from being retracted based on the error signals.

According to the second embodiment described above, the child seat detecting means is provided. As the child seat detecting means, a weight sensor for detecting a load on the seat or a tension sensor for detecting a tensile stress of the seat belt can be used.

Since the child seat is generally mounted on the passenger's seat, the load corresponding to the child seat is applied to the seat. Therefore, the detection whether the child seat is mounted on the seat or not can be performed by detecting the load to the seat.

Further, since the child seat is generally mounted on and fixed to the seat by fastening the seat belt, the detection whether the child seat is mounted on the seat or not can be also performed by detecting the tensile stress of the seat belt.

The child seat detecting means can be provided directly to the retracting device.

As already explained in connection with the second embodiment, the seat belt is retracted at a lower retracting force, when the crash predicting signal is outputted. The retracting force can be adjusted by changing a time period for retracting or a speed of retracting the seat belt. For example, in the case that the retracting speed is constant, the time period is controlled to be shorter, whereas in the case that the time period for the retraction is constant, the retracting speed is made lower. The retracting force can be preferably seat to a value of 85% of the retracting force at the normal operation, so that unpleasant feeling to the occupant can be sufficiently reduced.

As in the same manner to the first embodiment, in the seat belt apparatus having multiple crash predicting means, the seat belt can be retracted at the normal retracting force when the crash predicting signals are outputted from the multiple crash predicting means.

What is claimed is:

1. A seat belt apparatus for a vehicle comprising:
   a seat belt fastened to a vehicle seat and configured to tightly hold an occupant sitting in the vehicle seat to the vehicle seat;
   a retracting device for retracting the seat belt;
   multiple crash predicting means for outputting respective crash predicting signals; and
   a control unit for operating the retracting device when the control unit receives at least one of the crash predicting signals, so that the seat belt is retracted,
   wherein the seat belt apparatus further comprises an OFF switch provided in a passenger room of the vehicle for outputting an OFF signal to prohibit the operation of the retracting device when the OFF switch is placed in an OFF state, and
   wherein the control unit operates the retracting device in the case that the crash predicting signals from the multiple crash predicting means are inputted to the control unit even when the OFF signal is outputted from the OFF switch.

2. A seat belt apparatus according to claim 1, wherein the OFF switch is configured to be manually operated by a vehicle passenger.

3. A seat belt apparatus for a vehicle comprising:
   a seat belt fastened to a vehicle seat and configured to tightly hold an occupant to the vehicle seat;
   a retracting device for retracting the seat belt;
   one or more crash predicting means for outputting one or more respective crash predicting signals;
   an OFF switch provided in a passenger area of the vehicle, the OFF switch having an ON state indicating normal operation of the retracting device and an OFF state indicating an inhibited operation of the retracting device; and
   a control unit for controlling operation of the retracting device based in part on the one or more crash predicting signals and whether the OFF switch is in the ON state or the OFF state,
   wherein the one or more crash predicting means comprise a plurality of crash predicting means,
   wherein the control unit controls the retracting device to retract the seatbelt when the control unit receives at least one but fewer than all of the plurality crash predicting signals, and the OFF switch is in the ON state,
   wherein the control unit prohibits operation of the retracting device when the control unit receives at least one but fewer than all of the plurality crash predicting signals, and the OFF switch is in the OFF state, and
   wherein the control unit controls the retracting device to retract the seatbelt when the control unit receives all of the plurality crash predicting signals, and the OFF switch is in the OFF state.

* * * * *